(12) United States Patent
Johnson et al.

(10) Patent No.: US 7,918,375 B2
(45) Date of Patent: Apr. 5, 2011

(54) PNEUMATICALLY OPERABLE FASTENER-DRIVING TOOL AND SEAL MECHANISM ASSEMBLY, AND A METHOD OF OPERATING THE SAME

(75) Inventors: Michael P. Johnson, Round Lake, IL (US); Patrick J. Curtis, Glenn Ellyn, IL (US)

(73) Assignee: Illinois Tool Works Inc., Glenview, IL (US)

( * ) Notice: Subject to any disclaimer, the term of this patent is extended or adjusted under 35 U.S.C. 154(b) by 169 days.

(21) Appl. No.: 12/226,475

(22) PCT Filed: Mar. 20, 2007

(86) PCT No.: PCT/US2007/006856
§ 371 (c)(1),
(2), (4) Date: Apr. 29, 2009

(87) PCT Pub. No.: WO2007/126624
PCT Pub. Date: Nov. 8, 2007

(65) Prior Publication Data
US 2009/0272782 A1 Nov. 5, 2009

(51) Int. Cl.
*B25C 1/04* (2006.01)
(52) U.S. Cl. .................. 227/130; 277/436; 173/1
(58) Field of Classification Search ............... 227/8, 10, 227/130, 133; 277/436, 438, 353, 560, 558; 173/1
See application file for complete search history.

(56) References Cited

U.S. PATENT DOCUMENTS

| | | | | |
|---|---|---|---|---|
| 4,530,455 A | * | 7/1985 | Vornberger | 227/130 |
| 5,169,160 A | * | 12/1992 | Gaskill et al. | 277/438 |
| 5,431,415 A | * | 7/1995 | Millonig et al. | 277/353 |
| 6,189,894 B1 | * | 2/2001 | Wheeler | 277/549 |
| 6,290,235 B1 | * | 9/2001 | Albertson | 277/510 |

* cited by examiner

*Primary Examiner* — Scott A. Smith
(74) *Attorney, Agent, or Firm* — Law Offices of Steven W. Weinrieb

(57) ABSTRACT

A pneumatically operable fastener-driving tool and seal mechanism assembly, and a method of operating the same, comprises the use of a single, annular seal member, having a substantially V-shaped cross-sectional configuration, disposed within an annularly recessed portion of the fastener-driving tool piston in such a manner that the open region of the V-shaped annular seal member is disposed toward the relatively high-pressure upstream end portion of the fastener-driving tool cylinder, while, conversely, the closed region of the V-shaped annular seal member is disposed toward the relatively low-pressure downstream end portion of the pneumatic tool cylinder Accordingly, the relatively high-pressure air acts upon the radially outwardly flared lip portion of the annular seal member during a power stroke, while relatively low-pressure air acts upon the radially outwardly flared lip portion of the annular seal member during a return stroke, whereby only a single V-shaped annular seal member is required to achieve proper sealing performance characteristics throughout an operative cycle of the fastener-driving tool.

2 Claims, 2 Drawing Sheets

PNEUMATICALLY OPERABLE FASTENER-DRIVING TOOL AND SEAL MECHANISM ASSEMBLY, AND A METHOD OF OPERATING THE SAME

FIELD OF THE INVENTION

The present invention relates generally to pneumatically operable fastener-driving tools, and more particularly to a new and improved pneumatically operable fastener-driving tool and seal mechanism assembly, and a method of operating the same, wherein a single, annular seal member, having a substantially V-shaped cross-sectional configuration, is disposed within an annularly grooved or recessed portion of the fastener driver blade piston in such a manner that the open region or radially outwardly flared portion of the V-shaped annular seal member is disposed toward the high-pressure upstream end portion of the pneumatic tool cylinder within which the fastener driver blade piston, and the driver blade fixedly attached thereto, are movably disposed, while, conversely, the closed region of the V-shaped annular seal member, at which the radially outwardly flared portion of the V-shaped annular seal member is integrally attached to the main body portion of the V-shaped annular seal member, is disposed toward the low-pressure downstream end portion of the pneumatic tool cylinder. Accordingly, only a single, V-shaped, annular seal member, exhibiting increased service life as compared to other annular seal members, is capable of providing the desirable sealing operations or functions within the pneumatically-operable fastener-driving tool during both the fastener-driving and return strokes of the piston and the fastener-driving driver blade.

BACKGROUND OF THE INVENTION

Pneumatically operable, fastener-driving tools are of course well-known in the art and are exemplified by means of the pneumatically operable, fastener-driving tools that are disclosed within United States Patent Application Publication 2006/0016845 which was published on Jan. 26, 2006 in the name of Ishizawa et al., and United States Patent Application Publication 2004/0188488 which was published on Sep. 30, 2004 in the name of Ishizawa et al. Both of the aforenoted pneumatically operable, fastener-driving tools basically comprise substantially the same operational components, such as, for example, a cylinder, a driving piston movably disposed within the cylinder, a source of compressed air for acting upon and moving the driving piston downwardly through a fastener-driving stroke, and a vertically oriented driver blade which is fixedly mounted upon the movable driving piston so as to project downwardly beneath the piston in order to be in position to engage a fastener and thereby drive the fastener outwardly from the tool when the driving piston is moved downwardly through its fastener-driving stroke. In addition, various seal mechanisms are incorporated within the outer peripheral edge portions of the driving pistons so as to operatively engage and cooperate with the internal peripheral wall portions of the cylinder in order to effectively pneumatically separate and seal off the oppositely disposed sides of the driving piston from each other. While O-ring type seal members are often used as such seal mechanisms, O-ring type seal members must be constantly biased into engagement with the internal peripheral wall portions of the cylinder in order to perform their sealing functions, and accordingly, such O-ring type seal members experience relatively rapid and significant wear which, of course, in turn, causes such seal members to exhibit relatively shortened service lives requiring maintenance to be performed within relatively shortened periods of time.

An alternatively configured seal mechanism, which has been used within various pneumatically operable applications or systems, is disclosed within FIG. 1, and it is to be noted that such drawing figure substantially corresponds to a drawing which appears within a product manual which is entitled K-Seal™ and which is published by the MICRODOT corporation of Greenwich, Conn. More particularly, it is seen that a pneumatically operable system cylinder is disclosed at 10, and that a piston 12, mounted upon a piston rod 14, is movably disposed within the cylinder 10. The cylinder 10 comprises an internal peripheral wall structure 16, and it is seen that the piston 12 comprises a pair of axially spaced annularly recessed portions 18,20 within which a pair of axially spaced annular seal mechanisms 22,24 are respectively disposed. Each one of the annular seal mechanisms 22,24 has a substantially V-shaped cross-sectional configuration, however, it is to be appreciated that in accordance with the usage of such annular seal mechanisms 22,24 upon the piston 12 within the pneumatically operable system, the upper one of the annular seal mechanisms 22 is oriented in such a manner that the substantially V-shaped cross-sectional configuration thereof is oriented upwardly, whereas, conversely, the lower one of the annular seal mechanisms 24 is oriented in such a manner that the substantially V-shaped cross-sectional configuration thereof is effectively inverted so as to be oriented downwardly.

Accordingly, when the pair of substantially V-shaped seal mechanisms 22,24 are respectively disposed within the pair of axially spaced annularly recessed portions 18,20 of the piston 12, and are disposed so as to have their aforenoted orientations, the pair of substantially V-shaped seal mechanisms 22, 24, when effectively considered together, have a resulting composite cross-sectional configuration that resembles the letter K, as can be readily appreciated from FIG. 1, and hence, the aforenoted reference to the seal mechanism as a K-Seal™. It can be readily appreciated, however, that while the dual seal mechanism system of MICRODOT performs satisfactorily regardless of the direction in which the piston 12 is being moved, the dual seal mechanism system of MICRODOT nevertheless does require the use of a pair of the seal mechanisms 22, 24. Under certain circumstances, or more particularly, in connection with the implementation of certain operating systems, such as, for example, portable pneumatically operable tools, relatively small size and compactness are desirable objectives. Accordingly, such a dual seal mechanism system, entailing such a relatively large axial dimension or extent in order to in fact accommodate both of the axially spaced seal mechanisms, would not be practical.

It is noted that the aforenoted X-Seal™ product manual makes reference to U.S. Pat. No. 4,089,533 which issued to Knudson on May 16, 1978. More particularly, as disclosed within FIG. 2, which substantially corresponds to FIG. 1 of the aforenoted patent to Knudson, a pneumatically operable application or system comprises a cylinder 1 having a cylindrical body 3 and a pair of end caps 5, 7 fixedly mounted within the oppositely disposed ends of the cylindrical body 3. A piston 9, fixedly mounted upon a piston rod 11 which extends through an opening 13 defined within the end cap 7, is adapted to be movably disposed within the cylindrical body 3, and it is seen that the end cap 7 is also provided with an annular groove 25 within which an annular seal ring 23 is disposed for sealingly engaging the piston rod 11 as the piston rod 11 moves within the opening 13. Ports 29,31 are provided within opposite ends of the cylindrical body 3 for admitting and exhausting air into and out of the cylindrical body 3 in connection with the movement of the piston 9 within the cylindrical body 3, and in connection with the movement of the piston 9 within the cylindrical body 3 and with respect to the inner peripheral wall portion 15 of the cylindrical body 3, the piston 9 includes an annular groove 19 within which a single annular seal ring 17 is disposed for dynamically engaging the inner peripheral wall portion 15 of the cylindrical body 3. More particularly, as can best be appreciated from FIG. 3, which substantially corresponds to FIG. 5 of the aforenoted patent to Knudson, it is seen that the annular seal ring 17 is disposed within the annular groove 19, the annular groove 19 comprises a radially inner annular wall portion 21, and the annular seal ring 17 comprises upper and lower end faces 33, 35. Still yet further, the annular seal ring 17 is seen to comprise an outer peripheral wall portion 39, and a radially outwardly flared, flexible lip portion 41 is integrally connected to the main body portion of the annular seal ring 17. Still yet further, the radially outwardly flared, flexible lip portion 41 of the annular seal ring 17 comprises a free end tip portion 49, and that the free end tip portion 49 effectively forms a dynamic interference seal with the inner peripheral wall portion 15 of the cylindrical body 3.

Accordingly, while the aforenoted patent to Knudson discloses the use of a single seal member 17, similar to one of the seal members disclosed within the MICRODOT product manual and having substantially the same V-shaped cross-sectional configuration, it is respectfully submitted that the single seal member 17 will not in fact be properly operable so as to achieve the desired sealing functions during both of the reciprocal movements of the piston 9 within the cylindrical body 3 and with respect to the inner peripheral wall portion 15 of the cylindrical body 3. More particularly, in accordance with the disclosure, principles, and teachings of the Knudson patent, and as has been noted hereinbefore, the ports 29,31 are provided within the opposite ends of the cylindrical body 3 for admitting and exhausting pressurized air into and out of the cylindrical body 3 in connection with the movement of the piston 9 within the cylindrical body 3. Specifically, the pressurized air, having a sufficiently or relatively large predetermined pressure value, acts within the forwardly disposed void region 59 of the seal member 17 so as to effectively force the radially outwardly flared, flexible lip portion 41, and the free end tip portion 49 thereof, into dynamic engagement with the inner peripheral wall portion 15 of the cylindrical body 3 during, for example, the downward movement of the piston 9 as viewed within FIGS. 2 and 3. However, this same sufficiently or relatively large predetermined pressure value will likewise act upon the back or rearwardly disposed side of the radially outwardly flared, flexible lip portion 41 when, for example, the piston 9 is being moved upwardly as viewed within FIGS. 2 and 3. Under such circumstances, it would seem that the radially outwardly flared, flexible lip portion 41 would be moved radially inwardly away from the inner peripheral wall portion 15 of the cylindrical body 3 whereby the sealing properties of the seal member 17 will effectively be compromised.

Accordingly, a need therefore exists in the art for a new and improved pneumatically operable fastener-driving tool and seal mechanism assembly wherein only a single seal mechanism, which is structured so as to exhibit an enhanced service life as compared to other conventional seal mechanisms previously employed within pneumatically operable fastener-driving tools, can be utilized within the pneumatically operable fastener-driving tool, wherein only a single seal mechanism, which is structured so as to nevertheless perform its sealing functions within a pneumatically operable fastener-driving tool, particularly during the differently pressurized operational cycles characteristic of such pneumatically operable fastener-driving tools, can in fact be successfully utilized, and wherein only a single seal mechanism needs to be utilized within a pneumatically operable fastener-driving tool so as to effectively render the pneumatically operable fastener-driving tool relatively small and readily portable.

SUMMARY OF THE INVENTION

The foregoing and other objectives are achieved in accordance with the teachings and principles of the present invention through the provision of a new and improved pneumatically operable fastener-driving tool and seal mechanism assembly, and a method of operating the same, wherein a single, annular seal member, having a substantially V-shaped cross-sectional configuration, is disposed within an annularly grooved or recessed portion of the fastener driver blade piston in such a manner that the open region or radially outwardly flared portion of the V-shaped annular seal member is disposed toward the high-pressure upstream end portion of the pneumatic tool cylinder within which the fastener driver blade piston, and the driver blade fixedly attached thereto, are movably disposed, while, conversely, the closed region of the V-shaped annular seal member, at which the radially outwardly flared portion of the V-shaped annular seal member is integrally attached to the main body portion of the V-shaped annular seal member, is disposed toward the low-pressure downstream end portion of the pneumatic tool cylinder. Accordingly, only a single, V-shaped, annular seal member, exhibiting increased service life as compared to other annular seal members, is capable of providing the desirable sealing operations or functions within the pneumatically-operable fastener-driving tool during both the relatively high-pressure fastener-driving stroke, and the relatively low-pressure return stroke, operative cycles of the piston and the fastener-driving driver blade.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 4:
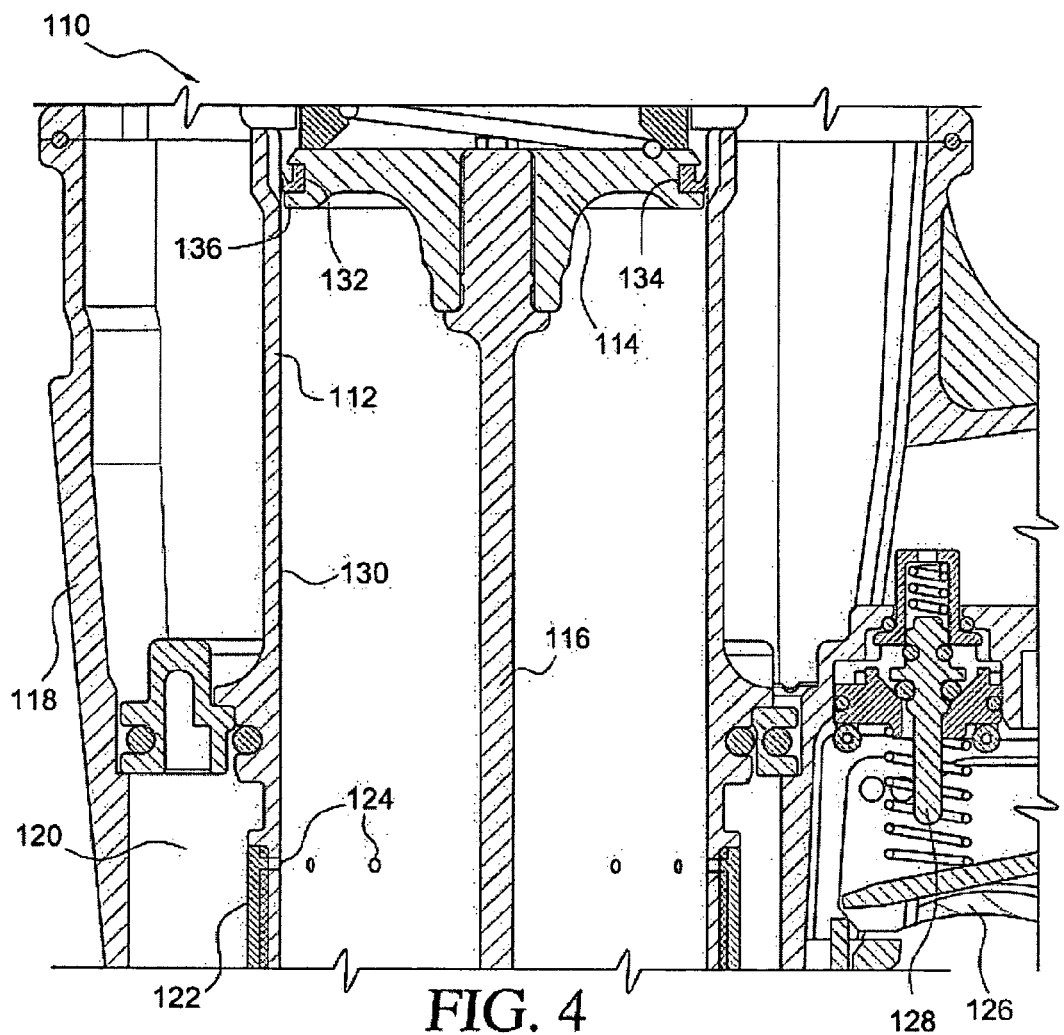
FIG. 4 is a cross-sectional view of a new and improved pneumatically operable fastener-driving tool and seal mechanism assembly, which has been constructed in accordance with the principles and teachings of the present invention, wherein only a single, annular seal member, having a substantially V-shaped cross-sectional configuration, is disposed within an annularly grooved or recessed portion of the fastener driver blade piston in such a manner that the open region or radially outwardly flared portion of the V-shaped annular seal member is disposed toward the high-pressure upstream end portion of the pneumatic tool cylinder within which the fastener driver blade piston, and the driver blade fixedly attached thereto, are movably disposed, while, conversely, the closed region of the V-shaped annular seal member, at which the radially outwardly flared portion of the V-shaped annular seal member is integrally attached to the main body portion of the V-shaped annular seal member, is disposed toward the low-pressure downstream end portion of the pneumatic tool cylinder, such that the single, V-shaped, annular seal member is capable of providing the desirable sealing operations or functions within the pneumatically-operable fastener-driving tool during both the fastener-driving and return strokes of the piston and the fastener-driving driver blade, while minimizing the axial length of the fastener-driver blade piston.

Referring now to the drawings, and more particularly to FIG. 4 thereof, a new and improved pneumatically operable fastener-driving tool and seal mechanism assembly, which has been constructed in accordance with the principles and teachings of the present invention, is disclosed and is generally indicated by the reference character 110. More particularly, it is seen that the pneumatically operable fastener-driving tool and seal mechanism assembly 110 comprises a working cylinder 112, within which there is reciprocally disposed a working piston 114, and a downwardly projecting driver blade 116, for engaging a fastener, not shown, is fixedly mounted upon the working piston 114 so as to be movable with the working piston 114 internally within the working cylinder 112. Relatively high pressure air, on the order of, for example, pressure values within the range of 80-120 psi, is adapted to be supplied into the upper end portion of the working cylinder 112 that is disposed above the working piston 114, and accordingly, as is well known in the art, when the working piston 114 and driver blade 116 are then moved downwardly during a driving or power stroke, under the influence of the aforenoted relatively high pressure air, the forward or lower end portion of the downwardly projecting driver blade 116 will engage the fastener, drive the same through the lower end portion of the pneumatically operable tool, and discharge the same outwardly from the pneumatically operable tool so as to be desirably embedded within a particular substrate. As is also well-known in the art, the tool housing 118, within which the working cylinder 112 is disposed, also comprises a return air chamber 120 within which a check valve mechanism 122 is disposed.

A first, upper set of circumferentially spaced apertures 124 is defined within side wall portions of the working cylinder 112, located axially intermediate the upper and lower ends of the working cylinder 112, and are adapted to be controlled by means of check valve mechanism 122, while a second, lower set of circumferentially spaced apertures, not shown, is defined within side wall portions of the working cylinder 112 which are located at the lower end portion of the working cylinder 112. Accordingly, as the working piston 114 is moved downwardly, under the influence of the aforenoted high pressure air acting upon the upper surface portion of the working piston 114, such as, for example, during a power or driving stroke, in order to correspondingly move the driver blade 116 downwardly so as to engage a fastener, drive the same through the lower end portion of the tool, and discharge the fastener outwardly from the tool and into the particular substrate, the air disposed beneath the working piston 114 will be routed through the second, lower set of apertures, not shown, and into the return air chamber 120.

Since the air conducted into the return air chamber 120 will then act upon the internal surface portion of the check valve mechanism 122 disposed within the return air chamber 120, the check valve mechanism 122 will be disposed at its CLOSED position so as to maintain the first, upper set of apertures 124 closed whereby the air, to be subsequently used as return air for returning the working piston 114 to its initial or START position, will in fact be able to be accumulated within the return air chamber 120. After the working piston 114 has completed its power or driving stroke, the working piston 114 will be disposed beneath the first, upper set of apertures 124 and will begin to move upwardly so as to return toward its initial START position under rebound or inertial conditions as is known in the art. Accordingly, the air disposed above the working piston 114 will now effectively be forced through the first, upper set of apertures 124 so as to force the check valve mechanism 122 away from its CLOSED position and toward its OPEN position, and in addition, return air, which will be relatively low pressure air having pressure values on the order or within the range of 30-45 psi, will be discharged from the return air chamber 120 through means of the second, lower set of apertures, not shown, so as to return the working piston 114 to its initial or START position in preparation for another fastener-driving cycle. The pneumatically operable tool further comprises an actuating trigger mechanism 126 and a trigger-controlled valve assembly 128 as is known in the art.

Figure 5:
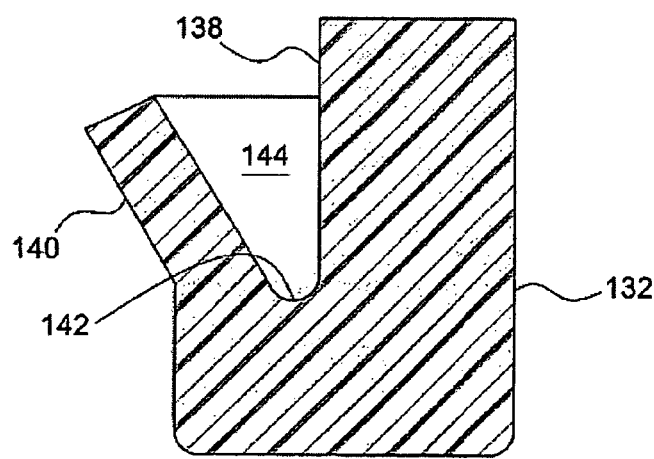
FIG. 5 is a partial cross-sectional view of a seal member, similar to one of the seal members disclosed within FIG. 1, which is to be used as the single seal member within the pneumatically operable fastener-driving tool as disclosed within FIG. 4, wherein the seal member has a substantially V-shaped cross-sectional configuration which is uniquely adapted for use within a pneumatically operable fastener-driving tool wherein the working piston of the pneumatically operable fastener-driving tool is respectively cyclically subjected to relatively high and relatively low pressure conditions during its power or driving stroke and during its return stroke.

Continuing further, and with additional reference being made to FIG. 5, in accordance with the principles and teachings of the present invention, in order to provide the desired sealing functions between the working piston 114 and the inner peripheral wall structure 130 of the working cylinder 112 during both the downward power or driving stroke and the upward return stroke of the working piston 114 with respect to the inner peripheral wall structure 130 of the working cylinder 112, a single, annular seal member 132 is disposed within an annularly grooved or recessed portion 134 formed within the outer peripheral edge portion 136 of the working piston 114. More particularly, the annular seal member 132 is seen to comprise a primary or main annular body portion 138 and a radially outwardly flared lip portion 140 which is integrally and flexibly connected to the primary or main annular body portion 138 at a junction 142 in such a manner that the radially outwardly flared lip portion 140 and the primary or main annular body portion 138 effectively provide the annular seal member 132 with a substantially V-shaped cross-sectional configuration. In addition, the distal end portion of the radially outwardly flared lip portion 140 of the annular seal member 132 is effectively spaced from the primary or main annular body portion 138 of the seal member 132 so as to define a void region 144 therebetween. Accordingly, it can be appreciated that during the cyclical operation of the pneumatically operable fastener-driving tool, that is, when a fastener firing and discharge cycle is to be initiated whereby the working piston 114 and the driver blade 116 will be moved through their power or driving strokes, the aforenoted relatively high-pressure air, characterized by means of pressure values on the order or within the range of 80-120 psi, will be admitted into the upper region of the working cylinder 112, that is, that region of the working cylinder 112 which is disposed above the working piston 114, so as to act upon the upper surface portion of the working piston 114 and thereby cause the working piston 114, and the driver blade 116 integrally connected thereto, to begin to move downwardly within the working cylinder 112 from their START positions as illustrated within FIG. 4. Accordingly, at this point in time, it can be further appreciated that in addition to acting upon the upper surface portion of the working piston 114, the relatively high-pressure air also acts upon the annular seal member 132.

More particularly, the incoming relatively high-pressure air will act upon the radially outwardly exposed upper region of the annular seal member 132 and will especially impact upon the void region 144. In this manner, the flexibly mounted, radially outwardly flared lip portion 140 of the annular seal member 132 will effectively be forced radially outwardly into pressed engagement with the inner peripheral wall surface 130 of the working cylinder 112 so as to in fact ensure the proper sealing function of the annular seal member 132 with respect to the inner peripheral wall portion 130 of the working cylinder 112. Continuing further, as the working piston 114 and the driver blade 116 continue to move downwardly within the working cylinder 112, under the influence of the aforenoted high-pressure air acting upon the upper surface portion of the working piston 114, the air disposed beneath the working piston 114 will be conducted through the second, lower set of apertures, not shown but formed within the lower end portion of the side walls of the working cylinder, and into the return air chamber 120. Since the air conducted into the return air chamber 120 will then act upon the internal surface portion of the check valve mechanism 122 disposed within the return air chamber 120, the check valve mechanism 122 will be disposed at its CLOSED position so as to, in turn, maintain the first, upper set of apertures 124 closed whereby the air, to be subsequently used as return air for returning the working piston 114 to its initial or START position, will in fact be able to be accumulated within the return air chamber 120.

After the working piston 114 has completed its power or driving stroke, the working piston 114 will be disposed beneath the first, upper set of apertures 124 and will begin to move upwardly, under rebound or inertial conditions, as is known in the art, so as to return toward its initial START position. Accordingly, the air disposed above the working piston 114 will now effectively be forced through the first, upper set of apertures 124 so as to force the check valve mechanism 122 away from its CLOSED position and toward its OPEN position, and in addition, the return air, which will have been accumulated within the return air chamber 120 and which will be relatively low pressure air having pressure values on the order or within the range of 30-45 psi, will now be discharged from the return air chamber 120 through means of the second, lower set of apertures, not shown, so as to return the working piston 114 to its initial or START position in preparation for another fastener-driving cycle. It can therefore be appreciated still further that as the working piston 114 moves upwardly within the working cylinder 112 upon its return stroke so as to move toward and return to its initial START position, relatively low-pressure air is disposed above the working piston 114 and therefore acts upon the upper surface portion of the working piston 114 as well as upon the upper annular surface portion of the radially outwardly flared lip portion 140 and the void region 144 of the seal member 132.

Figure 1:
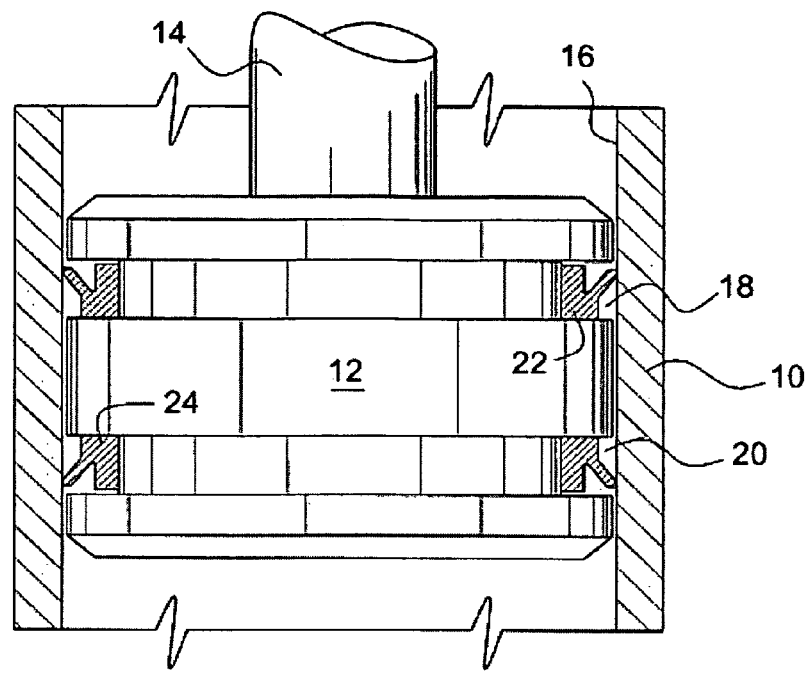
FIG. 1 is a cross-sectional view of a conventional, PRIOR ART pneumatically operable system wherein a pair of seal members, each having a substantially V-shaped cross-sectional configuration, are used in combination with each other, and in a relatively inverted mode with respect to each other, so as to effectively achieve a K-Seal™ assembly having, in effect, a cross-sectional configuration which resembles the letter K.
Figure 2:
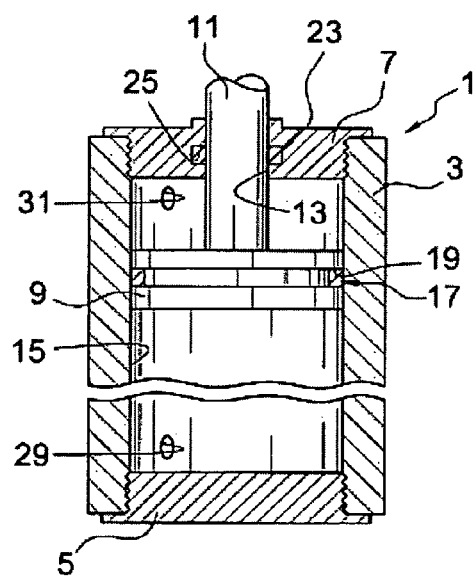
FIG. 2 is a cross-sectional view of a conventional, PRIOR ART pneumatically operative system, as disclosed within U.S. Pat. No. 4,089,533, wherein a single seal member, having a substantially V-shaped cross-sectional configuration, is disposed within an annular groove or recess defined within a peripheral region of the operating piston of the system.
Figure 3:
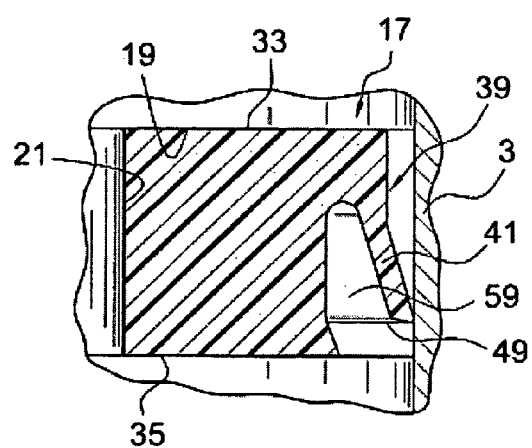
FIG. 3 is an enlarged, detailed view of a section of the piston member, and the seal member, having the substantially V-shaped cross-sectional configuration, disposed within the annular groove or recess thereof, as disclosed within the conventional, PRIOR ART pneumatically operated system of FIG. 2.

Still further, and in a similar manner, the relatively low-pressure return air which is now effectively flowing out from the return air chamber 120, is now not only acting upon the undersurface portion of the working piston 114 but, in addition, is also acting upon, in effect, the lower annular surface portion of the radially outwardly flared lip portion 140 of the annular seal member 132 which is disposed toward or faces the lower end portion of the working cylinder 112. Accordingly, these two, relatively-low pressure air regions, disposed upon opposite sides of the working piston 114 as the same is moving upwardly within the working cylinder 112 so as to return to its initial START position, effectively serve to maintain the radially outwardly flared lip portion 140 of the annular seal member 132 in a balanced state wherein the same is disposed and maintained in engagement with the inner peripheral wall portion 130 of the working cylinder 112 so as to ensure the proper sealing of the annular seal member 132 with respect to the inner peripheral wall portion 130 of the working cylinder 112 during the upward return stroke of the working piston 114. More particularly, and contrary, for example, to the conventional, PRIOR ART pneumatically operable system as disclosed within FIGS. 2 and 3, it can be appreciated that in view of the fact that relatively low-pressure air, disposed above and below the working piston 114, acts upon the radially outwardly flared lip portion 140 of the annular seal member 132 in the aforenoted manner, as opposed to the relatively high-pressure air acting upon one of the opposite sides of the piston 9 during both of the powered reciprocal strokes of the piston 9, the proper sealing of the radially outwardly flared lip portion 140 of the annular seal member 132, within the working cylinder 112 of the pneumatically-operable fastener driving tool, and with respect to the inner peripheral wall portion 130 of the working cylinder 112 of the pneumatically operable fastener driving tool, during the return stroke of the working piston 114, is effectively ensured.

Thus, it may be seen that in accordance with the principles and teachings of the present invention, there has been disclosed a new and improved pneumatically operable fastener-driving tool and seal mechanism assembly, and a method of operating the same, wherein a single, annular seal member, having a substantially V-shaped cross-sectional configuration, is disposed within an annularly grooved or recessed portion of the fastener driver blade piston in such a manner that the open region or radially outwardly flared portion of the V-shaped annular seal member is disposed toward the high-pressure upstream end portion of the pneumatic tool cylinder within which the fastener driver blade piston, and the driver blade fixedly attached thereto, are movably disposed, while, conversely, the closed region of the V-shaped annular seal member, at which the radially outwardly flared portion of the V-shaped annular seal member is integrally attached to the main body portion of the V-shaped annular seal member, is disposed toward the low-pressure downstream end portion of the pneumatic tool cylinder. Accordingly, only a single, V-shaped, annular seal member, exhibiting increased service life as compared to other annular seal members, such as, for example, conventional O-ring seal members, is capable of providing the desirable sealing operations or functions within the pneumatically-operable fastener-driving tool during both the relatively high-pressure fastener-driving stroke, and the relatively low-pressure return stroke, operative cycles of the piston and the fastener-driving driver blade.

In addition, by achieving the aforenoted sealing functions, during both the relatively high-pressure fastener-driving stroke and the relatively low-pressure return stroke operative cycles of the working piston and the fastener-driving driver blade, by means of the single, annular seal member having the substantially V-shaped cross-sectional configuration with the open region or radially outwardly flared portion of the V-shaped annular seal member disposed toward the high-pressure upstream end portion of the pneumatic tool cylinder, the need for a pair of oppositely disposed seal members having V-shaped cross-sectional configurations is obviated. Accordingly, the axial extent, or thickness dimension of the working piston, as taken along the longitudinal axis of the working cylinder, can effectively be minimized in view of the fact that the working piston needs to accommodate only a single annular seal member, as opposed to a pair of axially spaced annular seal members, and therefore, the axial length of the pneumatically operable tool is able to be rendered shorter such that the pneumatically operable tool is, in turn, rendered lighter in weight and more easily portable.

Obviously, many variations and modifications of the present invention are possible in light of the above teachings. It is therefore to be understood that within the scope of the appended claims, the present invention may be practiced otherwise than as specifically described herein.

What is claimed is:

1. A pneumatically operable fastener-driving tool and seal mechanism assembly, comprising:

a working cylinder having an inner peripheral wall portion;

a working piston movably disposed within said working cylinder along said inner peripheral wall portion;

a driver blade fixedly mounted upon said working piston for driving a fasten through and out from said pneumatically operable fastener-driving tool;

a source of pressurized air fluidically connected to said working cylinder for supplying working air, having a relatively high pressure value within the range of 80-120 psi, into said working cylinder in order to drive said working piston, and said driver blade fixedly mounted upon said working piston, through a power-driven stroke in order to drive a fastener through and out from said pneumatically operable fastener-driving tool;

an annular recess defined within an external peripheral edge portion of said working piston; and a single, annular seal member, having a substantially V-shaped cross-sectional configuration comprising a main body portion, an open void region, a radially outwardly flared lip portion adapted to be sealingly moved along said inner peripheral wall portion of said working cylinder, and a closed region at which said radially outwardly flared lip portion is integrally attached to said main body portion, disposed within said annular recess defined within said external peripheral edge portion of said working piston such that said open void region of said single, annular seal member having said substantially V-shaped cross-sectional configuration, is disposed toward that side of said working piston which is exposed to said source of pressurized air, having said relatively high pressure value within said range of 80-120 psi, so as to permit said relatively high pressure air to act upon said single, annular seal member, and within said open void region thereof, so as to effectively force said radially outwardly flared lip portion of said single, annular seal member into engagement with said inner peripheral wall portion of said working cylinder so as to ensure proper sealing between said working piston and said inner peripheral wall portion of said working cylinder during said power-driven stroke, whereas during a return stroke of said working piston, relatively low pressure return air, having a pressure value within the range of 30-45 psi, acts upon said closed region of said single, annular seal member whereby said radially outwardly flared lip portion of said single, annular seal member will remain engaged with said inner peripheral wall portion of said working cylinder so as to ensure proper sealing between said working piston and said working cylinder during said return stroke.

2. A method of operating a pneumatically operable fastener-driving tool, comprising the steps of:

providing said pneumatically operable fastener-driving tool with a working cylinder having an inner peripheral wall portion;

disposing a working piston within said working cylinder for movement along said inner peripheral wall portion of said working cylinder;

fixedly mounting a driver blade upon said working piston for driving a fastener through and out from said pneumatically operable fastener-driving tool;

fluidically connecting a source of pressurized air to said working cylinder for supplying working air, having a relatively high pressure value within the range of 80-120 psi, into said working cylinder in order to drive said working piston, and said driver blade fixedly mounted upon said working piston, through a power-driven stroke in order to drive a fastener through and out from said pneumatically operable fastener-driving tool;

providing an annular recess within an external peripheral edge portion of said working piston;

installing a single, annular seal member, having a substantially V-shaped cross-sectional configuration comprising a main body portion, an open void region, a radially outwardly flared lip portion adapted to be sealingly moved along said inner peripheral wall portion of said working cylinder, and a closed region at which said radially outwardly flared lip portion is integrally attached to said main body portion, within said annular recess defined within said external peripheral edge portion of said working piston;

fluidically connecting an upper region of said working cylinder, disposed above said working piston, to said relatively high pressure working air, having said relatively high pressure value within said range of 80-120 psi, so as to drive said working piston, and said driver blade fixedly mounted thereon, through a power-driven stroke such that said single, annular seal member having said substantially V-shaped cross-sectional configuration, will be exposed to said working air, having said relatively high pressure value within said range of 80-120 psi, so as to permit said relatively high pressure air to act upon said single, annular seal member, and within said open void region thereof, so as to effectively force said radially outwardly flared lip portion of said single, annular seal member into engagement with said inner peripheral wall portion of said working cylinder so as to ensure proper sealing between said working piston and said inner peripheral wall portion of said working cylinder during said power-driven stroke; and permitting said working piston to undergo a return stroke under the influence of relatively low pressure return air, having a pressure value within the range of 30-45 psi, which acts upon said closed region of said single, annular seal member whereby said radially outwardly flared lip portion of said single, annular seal member will remain engaged with said inner peripheral wall portion of said working cylinder so as to ensure proper sealing between said working piston and said working cylinder during said return stroke.

* * * * *